United States Patent
Klemin et al.

(10) Patent No.: US 9,094,333 B1
(45) Date of Patent: Jul. 28, 2015

(54) SYSTEMS AND METHODS FOR SENDING AND RECEIVING INFORMATION VIA A NETWORK DEVICE

(75) Inventors: Bruce A. Klemin, Rocklin, CA (US); Jerald K. Alston, Coto De Caza, CA (US); Derek J. Rohde, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 517 days.

(21) Appl. No.: 13/328,919

(22) Filed: Dec. 16, 2011

Related U.S. Application Data

(60) Provisional application No. 61/551,824, filed on Oct. 26, 2011.

(51) Int. Cl.
*H04L 12/00* (2006.01)
*H04L 12/931* (2013.01)
*H04L 12/935* (2013.01)

(52) U.S. Cl.
CPC .............. *H04L 49/356* (2013.01); *H04L 49/30* (2013.01)

(58) Field of Classification Search
None
See application file for complete search history.

(56) References Cited

U.S. PATENT DOCUMENTS

| | | | | |
|---|---|---|---|---|
| 6,424,621 | B1 * | 7/2002 | Ramaswamy et al. | 370/230 |
| 6,449,273 | B1 * | 9/2002 | Jennings, III | 370/389 |
| 6,483,804 | B1 * | 11/2002 | Muller et al. | 370/230 |
| 6,650,640 | B1 * | 11/2003 | Muller et al. | 370/392 |
| 6,993,023 | B2 * | 1/2006 | Foster et al. | 370/389 |
| 2003/0200330 | A1 * | 10/2003 | Oelke et al. | 709/238 |
| 2007/0201434 | A1 * | 8/2007 | Nakamura et al. | 370/352 |
| 2008/0232290 | A1 * | 9/2008 | Elzur et al. | 370/311 |
| 2012/0207057 | A1 * | 8/2012 | Karaoguz et al. | 370/254 |
| 2012/0311063 | A1 * | 12/2012 | Sharp et al. | 709/212 |
| 2013/0097345 | A1 * | 4/2013 | Munoz et al. | 710/104 |
| 2013/0107872 | A1 * | 5/2013 | Lovett et al. | 370/352 |

* cited by examiner

*Primary Examiner* — Robert C Scheibel
(74) *Attorney, Agent, or Firm* — Klein, O'Neill & Singh, LLP

(57) ABSTRACT

A network device is provided. The network device includes a port complex having a plurality of ports configured to operate at different operating speeds for sending and receiving information complying with different protocols. The network device further includes a processor complex having a plurality of processors for processing information complying with different protocols and received by the plurality of ports; and a message queuing system (MQS) for managing messages for the plurality of processors regarding the received information complying with different protocols. Each processor can process information complying with any of the different protocols.

20 Claims, 13 Drawing Sheets

US 9,094,333 B1

SYSTEMS AND METHODS FOR SENDING AND RECEIVING INFORMATION VIA A NETWORK DEVICE

CROSS-REFERENCE TO RELATED ART

This patent application claims priority under 35 USC 119(e) from the US Provisional Patent Application, entitled "SYSTEMS AND METHODS FOR SENDING AND RECEIVING INFORMATION VIA A NETWORK DEVICE", Ser. No. 61/551,824, filed on Oct. 26, 2011, the disclosure of which is incorporated herein by reference in its entirety.

TECHNICAL FIELD

The present invention relates to storage and network communication systems.

RELATED ART

Computing systems use adapters for sending and receiving information to and from other network devices and storage devices. Various protocols and standards may be used for such communication. Continuous efforts are being made to provide an adapter that can handle multiple protocols and efficiently send and receive information.

SUMMARY

The various embodiments of the present system and methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide advantages.

In one embodiment, a network device is provided. The network device includes a port complex having a plurality of ports configured to operate at different operating speeds for sending and receiving information complying with different protocols. The network device further includes a processor complex having a plurality of processors for processing information complying with different protocols and received by the plurality of ports; and a message queuing system (MQS) for managing messages for the plurality of processors regarding the received information complying with different protocols. Each processor can process information complying with any of the different protocols.

In another embodiment, a network device is provided. The network device includes a port complex having a plurality of ports configured to operate at different operating speeds for sending and receiving frames complying with different protocols. The network device further includes a first parser that initially parses a frame received by one of the plurality of ports by performing an initial checksum and determining a cyclic redundancy code and places the frame for further processing at a temporary memory storage having a plurality of memory storage locations. The network device also includes a scheduler that selects the frame from a temporary memory storage location and forwards the frame to a second parser that generates a message associated with the frame for one of a plurality of processors. Each processor can process information complying with any of the different protocols. The network device further includes a message queuing system (MQS) for managing messages for the plurality of processors regarding the frames complying with different protocols.

In yet another embodiment, a network device is provided. The network device includes a port complex having a plurality of ports configured to operate at different operating speeds for sending and receiving frames complying with different protocols. The network device also includes a first parser that initially parses a frame received by one of the plurality of ports by performing an initial checksum and determining a cyclic redundancy code and places the frame for further processing at a temporary memory storage having a plurality of memory storage locations. The network device also includes a scheduler that selects the frame from a temporary memory storage location and forwards the frame to a second parser that generates a message associated with the frame for one of a plurality of processors. Each processor can process information complying with any of the different protocols.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The various embodiments of the present systems and methods will now be discussed in detail with an emphasis on highlighting the advantageous features. These embodiments depict the novel and non-obvious systems and methods shown in the accompanying drawings, which are for illustrative purposes only. These drawings include the following figures, in which like numerals indicate like parts.

DETAILED DESCRIPTION

Figure 1A:
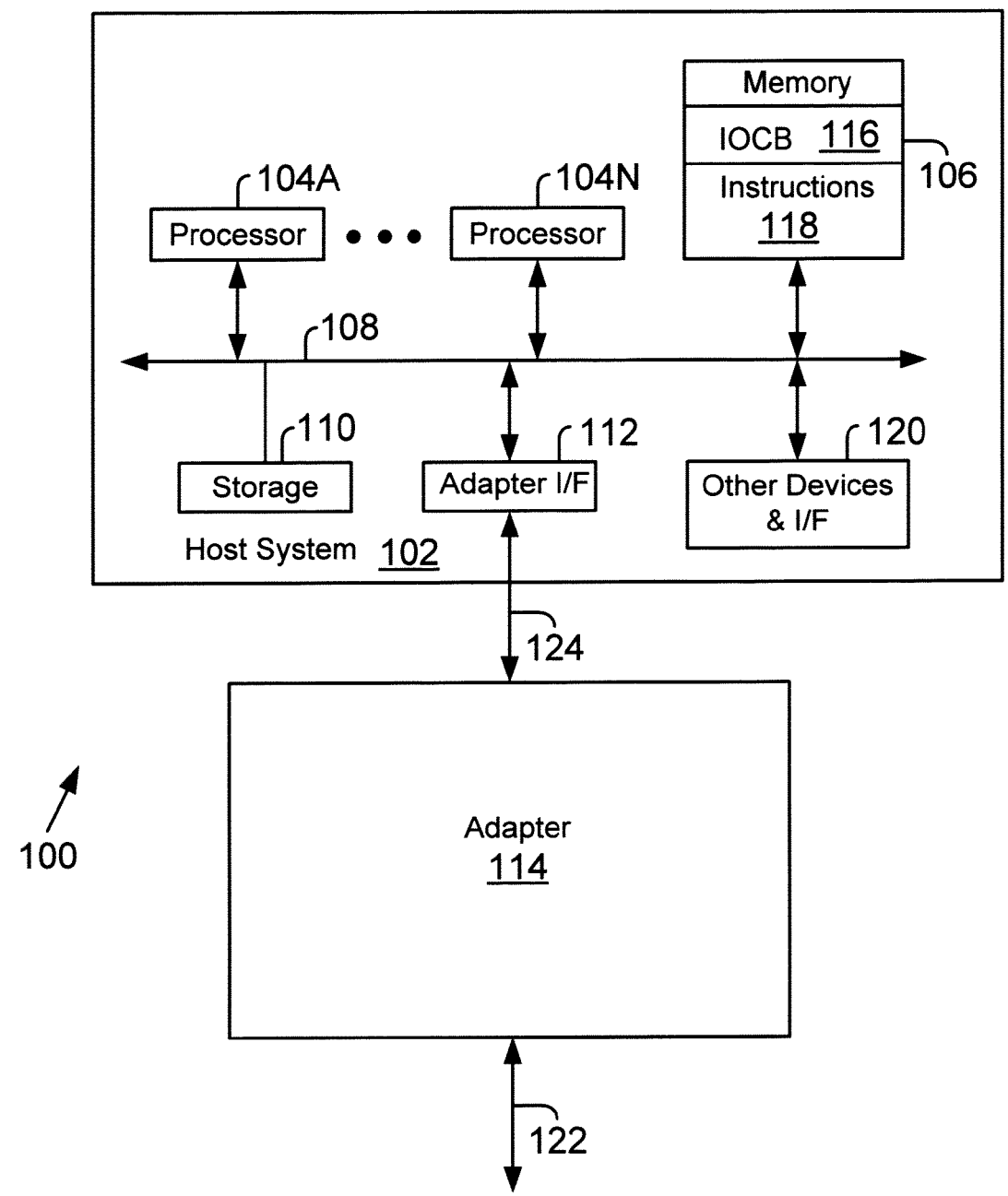
FIG. 1A is a block diagram of the internal functional architecture of a typical host system.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, etc.). The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

System 100:

FIG. 1A is a block diagram of a system 100, according to one embodiment.

Certain standard and well-known components, which are not germane to the present invention, have not been shown in FIG. 1A. In one embodiment, system 100 includes a computing system 102 (also referred to as a host system 102) that communicates with other devices via adapter 114 and a link 122. Host system 100 includes one or more processors 104 (shown as 104A-104N) and a memory 106, both of which are coupled to a connection system (also referred to as a bus system) 108. The bus system 108 is an abstraction that represents any one or more separate physical buses and/or point-to-point connections, connected by appropriate bridges, adapters and/or controllers. The bus system 108, therefore, may include, for example, a system bus, a Peripheral Component Interconnect (PCI) bus, a HyperTransport or industry standard architecture (ISA) bus, a SCSI bus, a universal serial bus (USB), or an Institute of Electrical and Electronics Engineers (IEEE) standard 1394 bus (sometimes referred to as "Firewire").

Processor 104 is the central processing unit (CPU) of the processing system 100 and, thus, controls its overall operation. In certain embodiments, processor 104 accomplishes this by executing programmable instructions stored in memory 106. Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

Memory 106 represents any form of random access memory (RAM), read-only memory (ROM), flash memory, or the like, or a combination of such devices. Memory 106 includes the main memory of host system 102. Processor 104 may execute machine-implemented instructions 118 for performing certain tasks, as described below in more detail. ROM stores invariant instruction sequences, such as start-up instruction sequences or basic input/output operating system (BIOS) sequences for operation of a keyboard (not shown).

In one embodiment, processor 104 generates an input/output control block (IOCB) 116 that is stored at host memory 106 or at an adapter memory. IOCB 116 provides information regarding a read or write operation. Adapter 114 uses information from the IOCB 116 and generates an I/O request for sending or receiving information.

Also connected to processor 104 through the bus system 108 are one or more internal mass storage devices 110, an adapter interface 112 and other devices and interfaces 120. The other devices and interfaces 120 may include a display device interface, a keyboard interface, and a pointing device interface.

Internal mass storage devices 110 (also referred to as storage 110) may be, or may include any conventional medium for storing data in a non-volatile manner, such as one or more magnetic or optical based disks, flash memory devices, CD-ROMs and others. Storage 110 stores operating system program files, application program files, and other instructions. Some of these files are stored on storage 110 using an installation program.

Host system 102 interfaces with adapter 114 via an adapter interface 112 and a link 124. Adapter 114 may be configured to send and receive information via link 122. In one embodiment, adapter 114 is configured to handle information complying with both network and/or storage protocols. Some common network and storage protocols are described below.

One common network protocol used by adapter 114 may be Ethernet based. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates over 100 Mbps. The description of the various embodiments described herein is based on using Ethernet (which includes 100 Base-T and/or Gigabit, 10 Gigabit, 40 Gigabit, 100 Gigabit Ethernet) as the network protocol. However, the adaptive embodiments disclosed herein are not limited to any particular protocol, as long as the functional goals are met by an existing or later developed network protocol.

Adapter 114 may also use Fibre Channel (also referred to as "FC"), which is a storage protocol used to access storage systems and devices. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Adapter 114 may also be configured to support Fibre Channel over Ethernet (FCOE) that has been developed to handle both Ethernet and Fibre Channel traffic in a storage area network. This functionality would allow Fibre Channel to leverage Ethernet (for example, 10 Gigabit) networks while preserving the Fibre Channel protocol/links.

"RoCE" (Remote Direct Memory Access (RDMA) over Converged Ethernet) is a network protocol that allows remote direct memory access over an Ethernet network. RoCE is a link layer protocol that allows communication between any two hosts within the same Ethernet broadcast domain. In one embodiment, adapter 114 is configured to support the RoCE protocol.

The iSCSI standard is based on Small Computer Systems Interface ("SCSI"), which enables host computer systems to perform block data input/output ("I/O") operations with a variety of peripheral devices including disk and tape devices, optical storage devices, as well as printers and scanners. A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over transmission control protocol/Internet Protocol (TCP/IP) networks. iSCSI defines mapping of the SCSI protocol with TCP/IP.

Figure 1B:
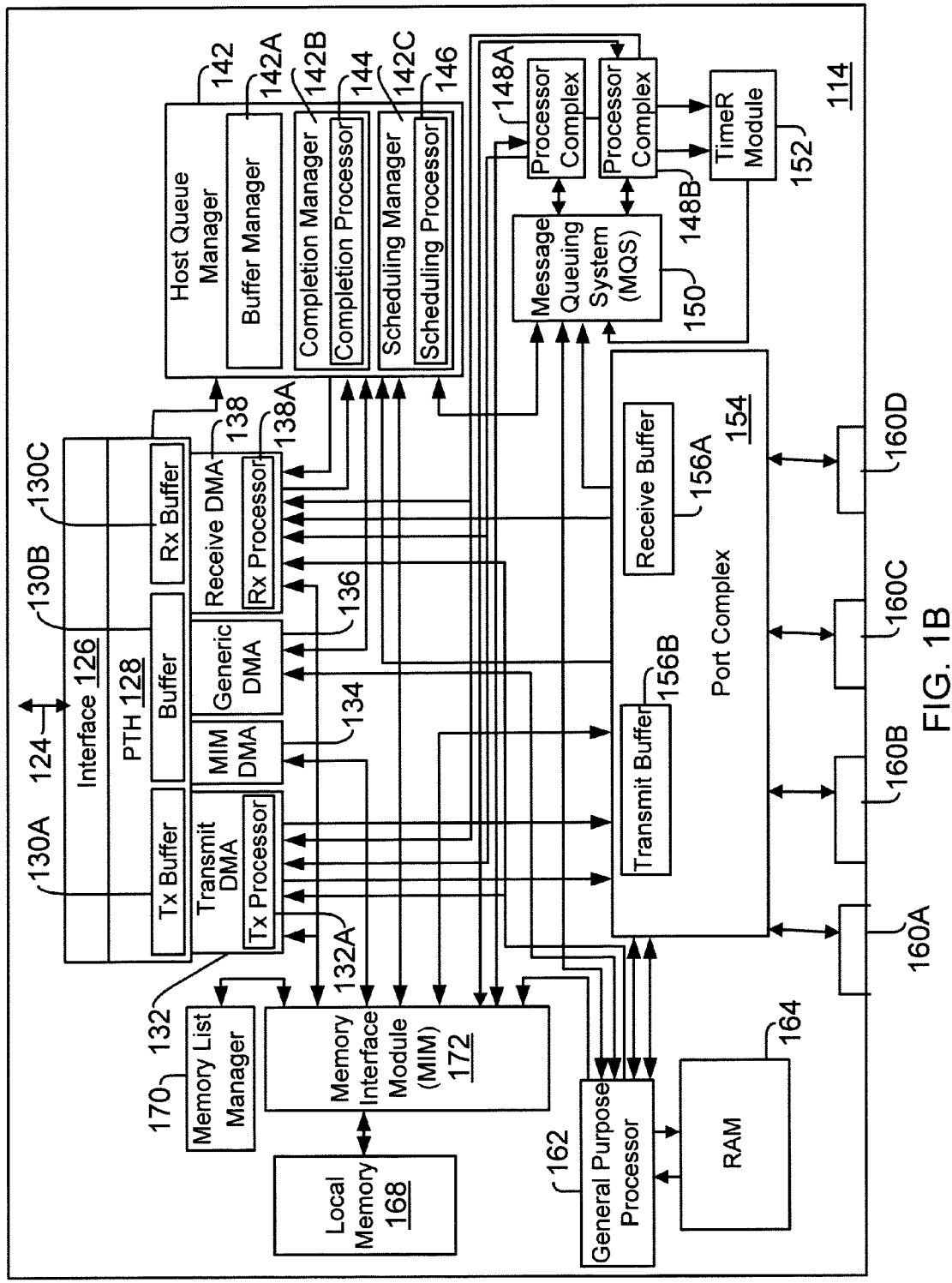
FIG. 1B is a block diagram of an adapter, according to one embodiment.

Adapter 114:

FIG. 1B shows a block diagram of adapter 114, according to one embodiment.

Adapter 114 can be configured to process frames complying with a plurality of protocols, including Ethernet, Fibre Channel, RoCE, FCOE, iSCSI and others. The term frame or packet as used herein means information that can be sent or received complying with one or more protocols/standards.

In one embodiment, adapter 114 may include a plurality of processor complexes 148A-148B and a general-purpose processor 162. Each processor complexes 148A, 148B may include one or more processors. In another embodiment, adapter 114 may only include a single processor complex with one or more processors. The processor complexes 148A, 148B are configured to perform various functions, for example, processing frames complying with different protocols, including FC, FCoE, RoCE, and/or iSCSI. Processor complexes 148A, 148B interface with a message queuing system ("MQS") 150 that fetches messages for the processor complexes 148A, 148B, as described below in more detail.

In one embodiment, any processor of a processor complex may be used to process a message complying with any of the protocols. In conventional systems, typically, a dedicated processor/hardware device is used for processing frames complying with different protocols. For example, a FC processor is used to process FC frames, an FCoE processor is used to process FCoE frames and an iSCSI processor is used to process iSCSI frames. Because conventional systems use dedicated processors/hardware devices, they are not very flexible and can become very expensive as the number of protocols continue to increase. Furthermore, the dedicated processor approach can be inefficient from a load balancing perspective, for example, if there are more FCoE frames compared to iSCSI frames, then the iSCSI processor may be idle, while the FCoE processor may be over-utilized. The approach of the adaptive embodiments described herein is to process messages efficiently and then make them available to any of the processors of a processor complex for processing.

The embodiments described herein provide a flexible solution, where a processor from either processor complex 148A-148B can be configured to process any message complying to any of the supported protocols. The MQS 150 efficiently sends messages to the processors, as described below in more detail and the processors process those messages accordingly. By not using dedicated processors, one is able to better load balance message processing among the processors.

The general-purpose processor 162 (also referred to herein as processor 162) may be used for performing adapter 114 configuration/management related operations as well as for providing information to an external computing system (not shown). Processor 162 has access to a memory module 164 (shown as RAM 164) for storing information.

Adapter 114 includes a memory interface module (MIM) 172 that manages access to local memory 168, host memory 106 or any other external memory by a plurality of clients/modules, for example, processor complexes 148A, 148B, processor 162, a host queue manager ("HQM") 142, a memory list manager (also referred to as "MLM") 170, a port complex 154 and others. In another embodiment, MIM 172 may control access to local memory 168, the host memory 106 and to any other external memory attached to adapter 144. Details regarding MIM 172 and the associated methods thereof are provided below.

Adapter 114 interfaces with host system 102 via an interface 126 and a link 124. In one embodiment, link 124 may be a PCI-Express link and interface 126 may be a PCI-Express interface with logic and circuitry to send and receive information packets complying with the PCI-Express standard. Interface 126 includes a sub-module 128 having a plurality of locations for temporarily storing information, for example, a transmit side first-in-first-out (FIFO) 130A, a buffer 130B used by the general purpose processor 162 and MIM 172 and a receive side buffer 130C. The transmit side buffer 130A is used to store and reorder packets that are received from host 102 and then transmitted by adapter 114. The receive side buffer 130C stores packets that are received by port complex 154 and then forwarded to host 102.

A plurality of direct memory access (DMA) modules are also provided to access link 124 for sending and receiving information from host 102. For example, a transmit DMA module 132 having a transmit side processor 132A is provided for managing packets on the transmit side, i.e. sent by adapter 114 to other devices. A receive DMA module 138 having a receive side processor 138A is provided to access link 124 for sending information to host 102 received via port complex 154. A generic DMA module 136 is also provided for enabling communication between general processor 162 and host 102. The generic DMA module 136 may also be used to interface with HQM 142 for providing access to host memory 106. A MIM DMA module 134 is provided so that the MIM 172 is able to interface with host 102 and host memory 106 via link 124.

In one embodiment, HQM 142 coordinates IOCB and packet movement between host 102 and various modules of adapter 114. HQM 142 may include a buffer manager 142A that manages buffers used for storing frames received from another device; a completion manager 142B uses a completion processor 144 for managing completion notifications received from different modules of adapter 114, as described below in more detail; and a scheduling manager 142C that uses a scheduling processor 146 for coordinating IOCB movement from the host system 102 and interfacing with MQS 150.

In one embodiment, port complex 154 that is used for sending and receiving information includes a plurality of ports 160A-160D, a receive side (may also be referred to as Rx) buffer 156A and a transmit side (may also be referred to as Tx) buffer 156B. Ports 160A-160D are configured to operate at different rates and/or comply with different protocols, for example, 1G/10G/20G/40G/100G and others. The term rate as used herein means an amount of information that a port can handle within a unit time, for example, a second. Ports 160A-160D may be configured to process frames complying with different protocols, for example, Fibre Channel, Ethernet, RoCE, FCOE and others. The adaptive embodiments described herein are not limited to any particular protocol or transfer rate.

Incoming frames are received by ports 160A-160D and temporarily stored at Rx buffer 156A. On the transmit side, frames are received from host system 102 and then stored at Tx buffer 156B before being transmitted to a destination by one of the ports 160A-160D. The frame processing and functionality of various modules of port complex 154 is described below with respect to FIG. 1C.

Figure 1C:
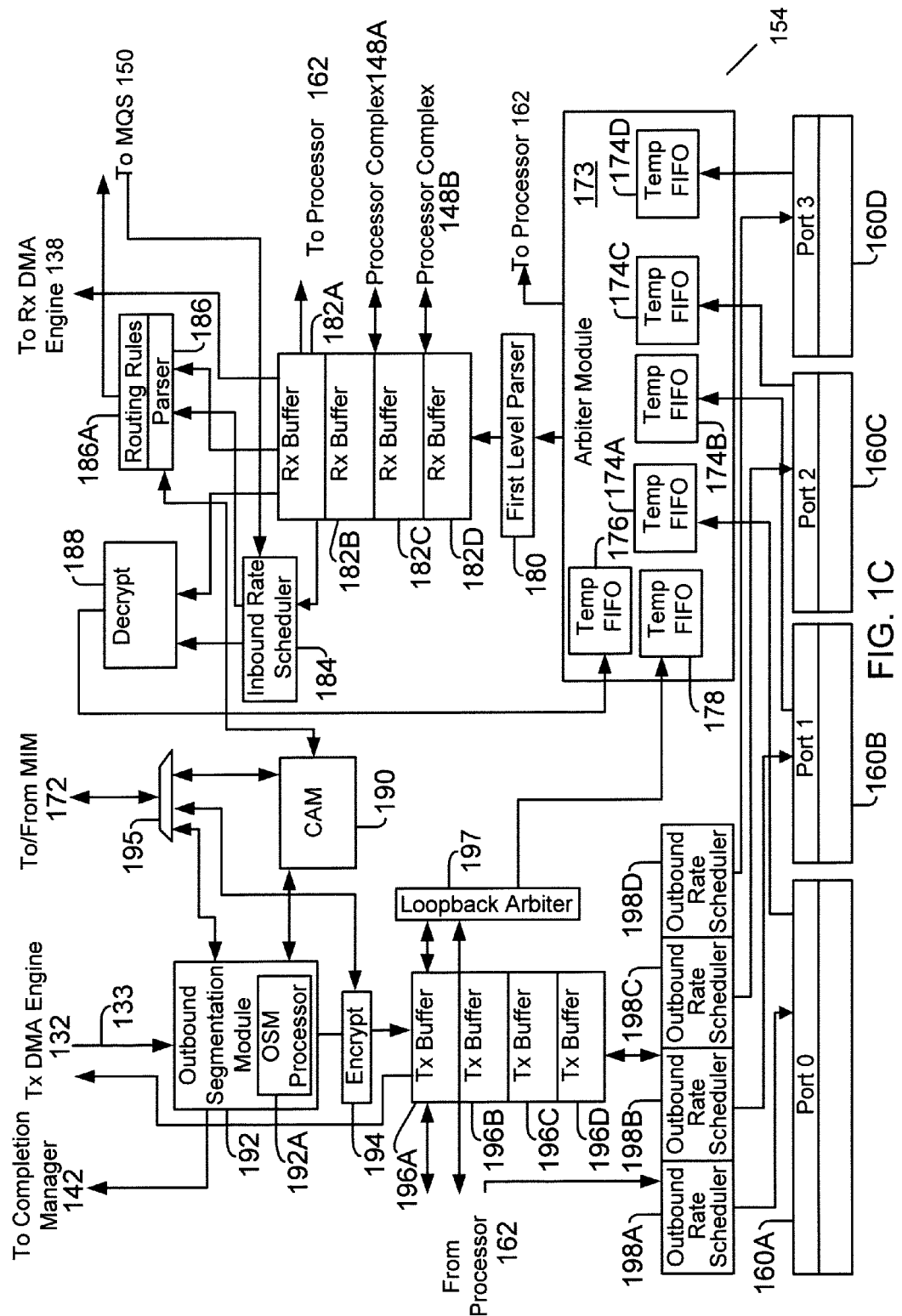
FIG. 1C is a block diagram of a port complex used by the adapter of FIG. 1B, according to one embodiment.

Port Complex 154:

FIG. 1C shows a block diagram of port complex 154, according to one embodiment. Frames received at ports 160A-160D are sent to an arbiter module 173 that includes a plurality of temporary storage locations shown as "Temp FIFO" for storing received frames. In one embodiment, each port 160A-160D has an associated Temp FIFO 174A-174D to store the received frames. For example, frames received at port 160A are stored at Temp FIFO 174A, frames received at port 160B are stored at Temp FIFO 174B, frames received at port 160C are stored at Temp FIFO 174C and frames received at port 160D are received at Temp FIFO 174D.

Some of the received frames may be encrypted and hence may have to be decrypted before they can be processed by arbiter 173. Arbiter 173 sends encrypted frames to a decryption module 188 via a first level parser 180. The decryption module 188 decrypts the frames. After the frames are decrypted, they are sent back to the Temp FIFO 176 and then processed just like any other received frame. In one embodiment, the Temp FIFO 176 may be dedicated to just storing the decrypted frames.

Arbiter module 173 also includes another Temp FIFO 178 for storing frames received from a loopback arbiter 197. The loopback arbiter 197 sends frames that may need to be re-processed by port complex 154.

After a frame is received, arbiter module 173 selects the frame from one of the temporary storage locations 174A-174D, 176 or 178. The selected frame is sent to the first level parser 180 that pre-processes the selected frame. For example, the first level parser 180 may perform an initial checksum and then determine the cyclic redundancy code (CRC). After the initial processing, the frame is placed at a memory storage location of a receive buffer 182 that includes a plurality of storage locations 182A-182D. Thereafter, the frame is sent to a second level parser 186 (shown as parser 186) for further processing.

The first level parser 180 also determines if a received frame is encrypted. If the frame is encrypted, then the first level parser 180 extracts the encryption/security information from the frame. The security information varies based on the received frame type, for example, "FC-SP" security information may be extracted for FCOE frames, "IP_Sec" information is extracted for IPv4/IPv6 frames and others. The encrypted frame with the extracted security information is then sent to the decryption module 188 that decrypts the frame and sends the decrypted frame back to Temp FIFO 176.

In one embodiment, port complex 154 further includes an inbound rate scheduler 184 that selects frames from receive buffer 182 for parser 186. The inbound rate scheduler 184 also selects any encrypted frames that may be stored at receive buffer 182.

Parser 186 maintains routing rules 186A for processing frames stored at receive buffer 182. The routing rules 186A may be based on information stored at a content addressable memory (CAM) 190. In one embodiment, CAM 190 may be used to store addressing information regarding different frame types and how they are processed.

In one embodiment, parser 186 generates a message for each frame selected from a receive buffer 182 location. A first portion of each message may be the same, for example, if the message is 128 bytes, then the first 32 bytes may be in a standard format. The remaining bytes may be configured based on the protocol/frame type, for example, Ethernet, Fibre Channel, RoCE, FCOE, iSCSI and others. The message generated by parser 186 is placed at MQS 150 that is described below in more detail.

In one embodiment, adapter 114 is configured to transmit information 133 received from host memory 106 via link 124. An Outbound Segmentation module (OSM) 192 receives information 133 via the transmit DMA engine 132. OSM 192 prepares information 133 into frames/packets for transmission. OSM 192 verifies information 133 with an access control list (ACL) stored at CAM 190. OSM 192 filters out any information that is not permitted for transmission. OSM 192 also processes outgoing frames, for example, by calculating digests of an iSCSI frame, inserting or deleting DIFs as well as parsing headers for outgoing frames. OSM 192 may also be used to perform large segment offload for various protocols, for example, TCP/IP, UDP/IP, FC/FCOE, RoCE and others.

OSM 192 sends processed frames to encryption module 194 that determines if the frames need encryption. If encryption is needed, then encryption module 194 obtains encryption control information via MIM 172. Based on the encryption control information, the frames are encrypted and then temporarily stored at one of the memory storage locations 196A-196D of transmit buffer 196. If the frames do not need encryption, then encryption module 194 simply places the frames at one of the memory storage locations 196A-196D of transmit buffer 196.

Frames from transmit buffer 196 are sent to one of the outbound rate schedulers 198A-198D. Each outbound scheduler schedules frame transmission for its associated port, for example, outbound scheduler 198A schedules for port 160A, while outbound scheduler 198D schedules for port 160D.

The loopback arbiter 197 may receive a frame from transmit buffer 196 that may need to be re-processed by port complex 154. The loopback arbiter 197 sends the frame to Temp FIFO 178. The frame is then selected by arbiter module 173 and re-processed just like any other frame.

Figure 1D:
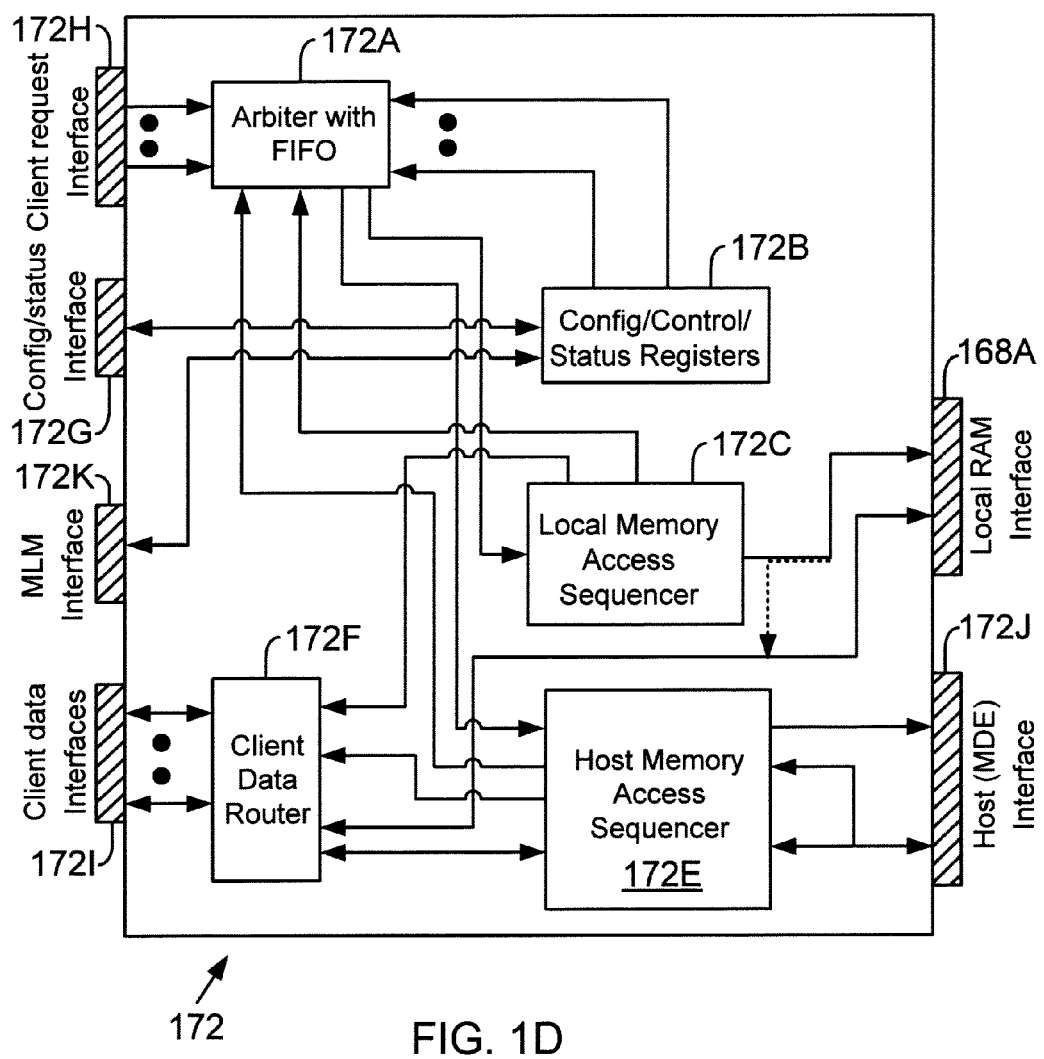
FIG. 1D is a block diagram of a memory interface module ("MIM") used by the adapter of FIG. 1B, according to one embodiment.

MIM 172:

FIG. 1D shows a block diagram of MIM 172 according to one embodiment. MIM 172 provides an interface to various modules of adapter 114 to access host memory 106 as well as the local memory 168 of adapter 114 or any externally attached memory device. The various modules may be referred to herein as clients (or sub-clients), for example, transmit DMA 132, MIM DMA 134, generic DMA 136, receive DMA 138, processor 162, processor complexes 148A, 148B and others. MIM 172 uses various interfaces 172G, 172H, 172I and 172K to receive requests, configuration information and data from the clients. For example, interface 172H may be used to receive client requests, while interface 172G may be used to receive configuration information. Interface 172K may be dedicated to receive information from the memory list manager 170. Data from various clients is received via interface 172I. MIM 172 interfaces with local memory 168 via an interface 168A and host memory 106 via an interface 172J.

MIM 172 may be configured via the configuration/status interface 172G. Configuration information may be stored at a control register 172B. In one embodiment, the configuration information includes identifiers for identifying a plurality of memory regions, the size of the memory regions, block size used by the memory regions and the number of blocks within each memory region. The configuration information further includes an address of the local memory 128, an address of the host memory 106 and an address of any other attached memory used by adapter 114 and accessed via MIM 172.

MIM 172 manages the various memories as regions, where each region includes a certain number of blocks. A client uses a memory region identifier and a block identifier to access storage space. MIM 172 uses the block identifier and the memory region to determine the physical location of a memory block where information may be stored.

In one embodiment, a plurality of clients send their requests via interface 172H. Interface 172H may use a multiplexer external to various MIM 172 components for selecting a request. This simplifies request routing and is more efficient than providing a dedicated interface for each client.

The requests to access either local memory 168, host memory 106 or any other memory managed by MIM 172 are received by an arbiter 172A that includes a FIFO (First-In First Out) based memory (not shown). The requests are first stored at the FIFO memory and then selected by arbiter 172A. If the request is for local memory 168, then the request is sent via a local memory access sequencer 172C and local memory interface 168A. If the request is for host memory 106, then the request is sent to host memory access sequencer 172E and then to the host memory 106 via interface 172J.

Client data for local memory 168 is received via interface 172I and then routed to local memory 168 via client data router 172F and the local memory access sequencer 172C. Client data for host memory 106 is routed via host memory access sequencer 172E. The various components/modules of MIM 172 are now described below in detail with respect to FIGS. 2A-2C.

Figure 2A:
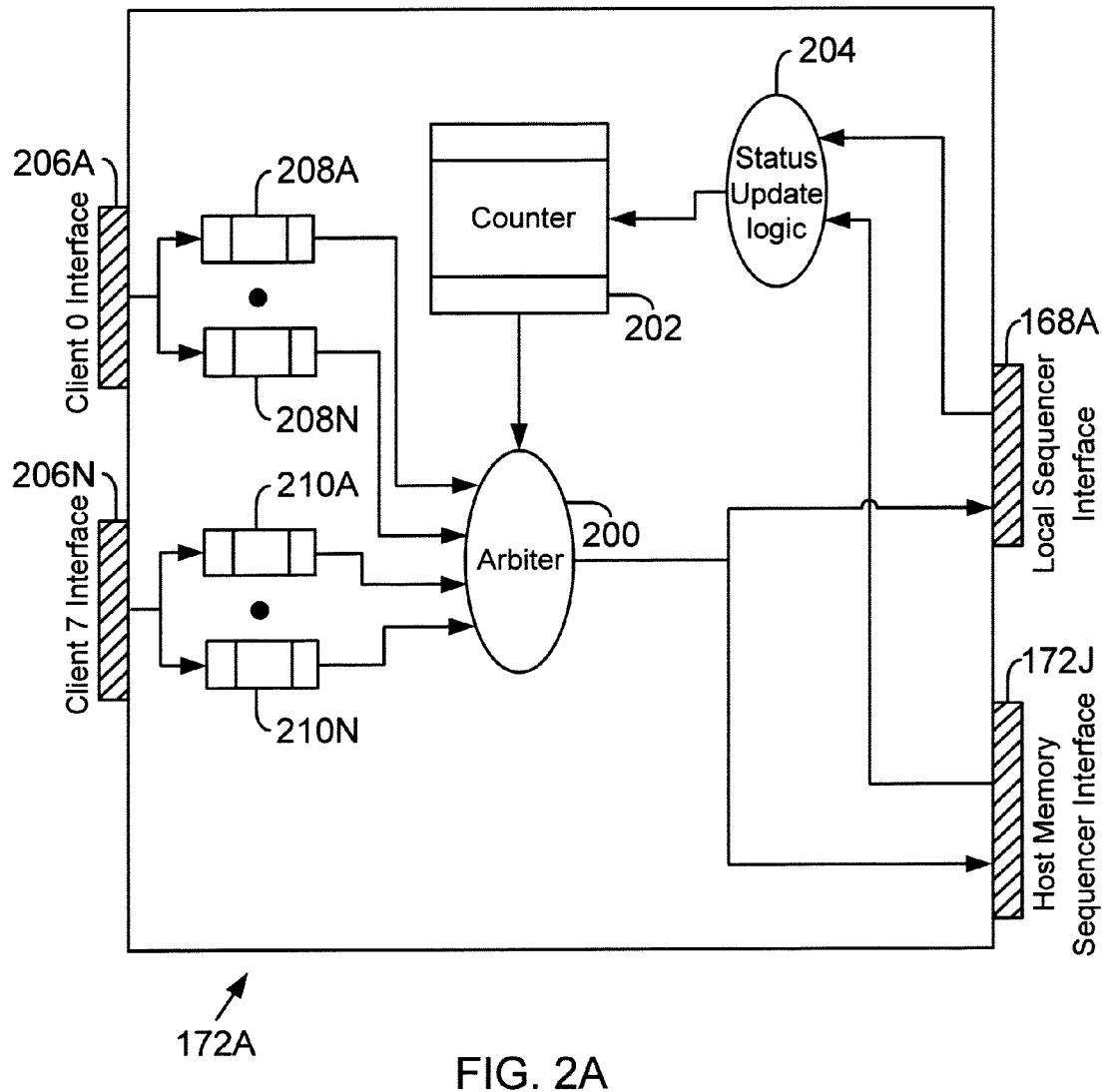
FIGS. 2A-2B are block diagrams of MIM components, according to one embodiment.

FIG. 2A shows an example of arbiter 172A, according to one embodiment. Client requests to transfer data to and/or from host memory 106 and/or local memory 168 are received via client interface 206A-206N that are included in interface 172H shown in FIG. 1D and described above. The requests are stored at FIFOs 208A-208N and 210A-210N and then selected by Arbiter 200 for further processing.

Each client request includes an identifier value that uniquely identifies the client. When arbiter 200 selects a client request, the client identifier value is used to increase a counter 202 value. The counter value indicates the number of client requests that have been selected for a given client at any given time.

When data transfer begins for a selected request, the sequencer (168A and/or 172J) sends a notification with the client identifier value to a status update logic 204. This indicates that the client request is being processed. The counter 202 value associated with the associated client identifier is then decreased. Therefore, at any given time, using counter 202 value, update logic 204 and the status notifications from sequencers 168A and 172J, one is able to determine the status of pending requests for each client.

Figure 2B:
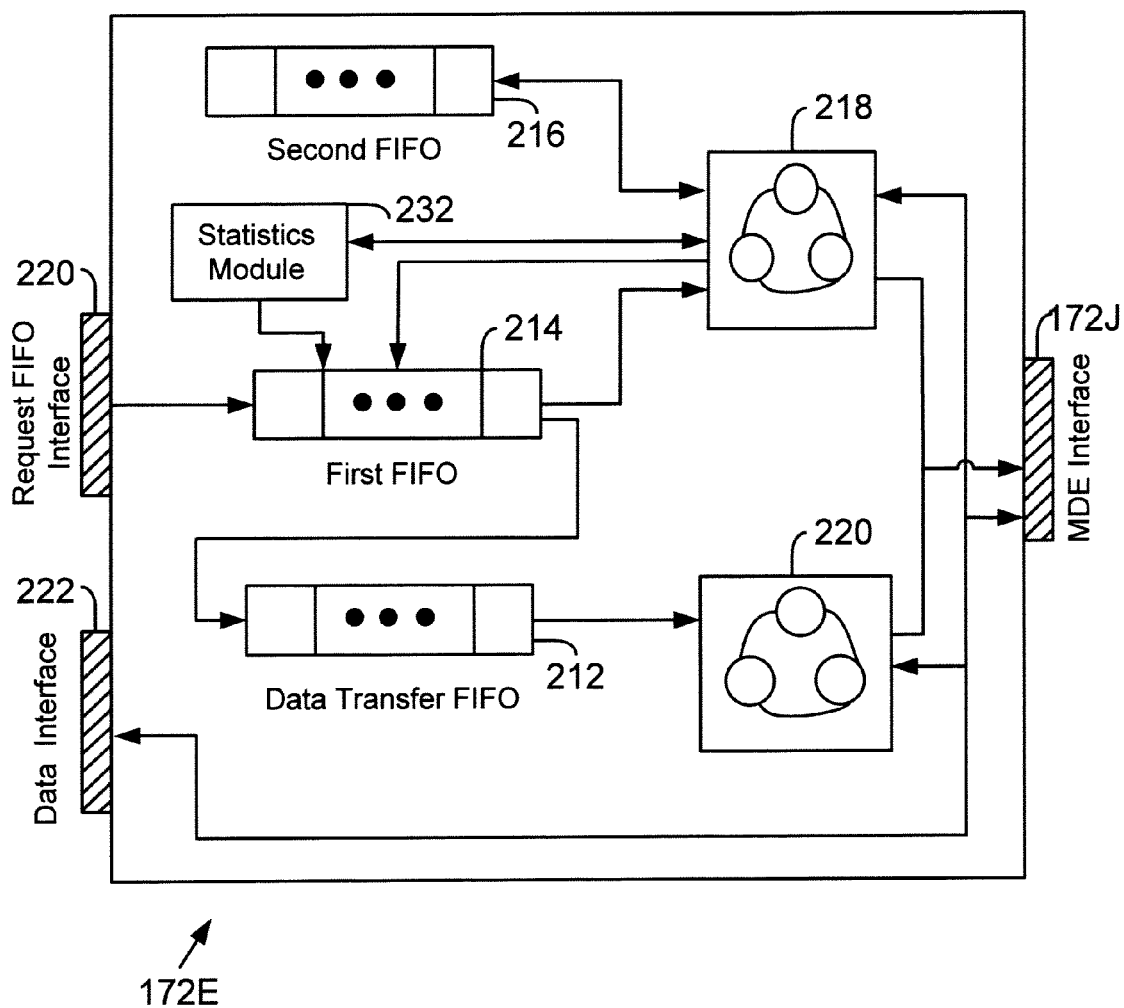

FIG. 2B shows a block diagram for host sequencer 172E that receives requests for host memory 106, according to one embodiment. Sequencer 172E grants access to host memory interface 224 for reading and writing data to host memory 106. Sequencer 172E includes a first state machine 218 that manages request preparation and a second state machine 220 that manages data transfer associated with the requests that have been processed and selected. The second state machine 220 receives data associated with a selected request via a data interface 222.

In one embodiment, sequencer 172E may include three FIFO-based staging segments 212, 214, 216 for storing/processing requests, as described below in more detail. The first FIFO 214 is used to initially store client requests. To determine an address for data at host memory 106, sequencer 172E may need to access page tables (not shown) stored at host memory 106. The second staging FIFO 216 is used to store requests while page tables are being accessed. In one embodiment, page table access may be performed in any order, but if a later request finishes its page access before an earlier request, then state machine 218 holds that request until the earlier request is processed. Data from first FIFO 214 is moved to the third FIFO 212 (shown as data transfer FIFO) 212. State machine 220 selects a request from FIFO 214 and then, if this is a write request, begins to transfer the data associated with the selected request from FIFO 212.

In one embodiment, sequencer 172E maintains a statistics module 232. Statistics module 232 maintains a data structure (not shown), for example, a table that stores information regarding the number of requests that are pending in the first FIFO 214 for each client. As requests are queued, a corresponding count for the client is increased, and as requests are released the count is decreased.

In one embodiment, if a received client request does not need a page table access, then the request is sent straight to data transfer FIFO 212. This makes data transfer to and from host memory 106 efficient.

Figure 2C:
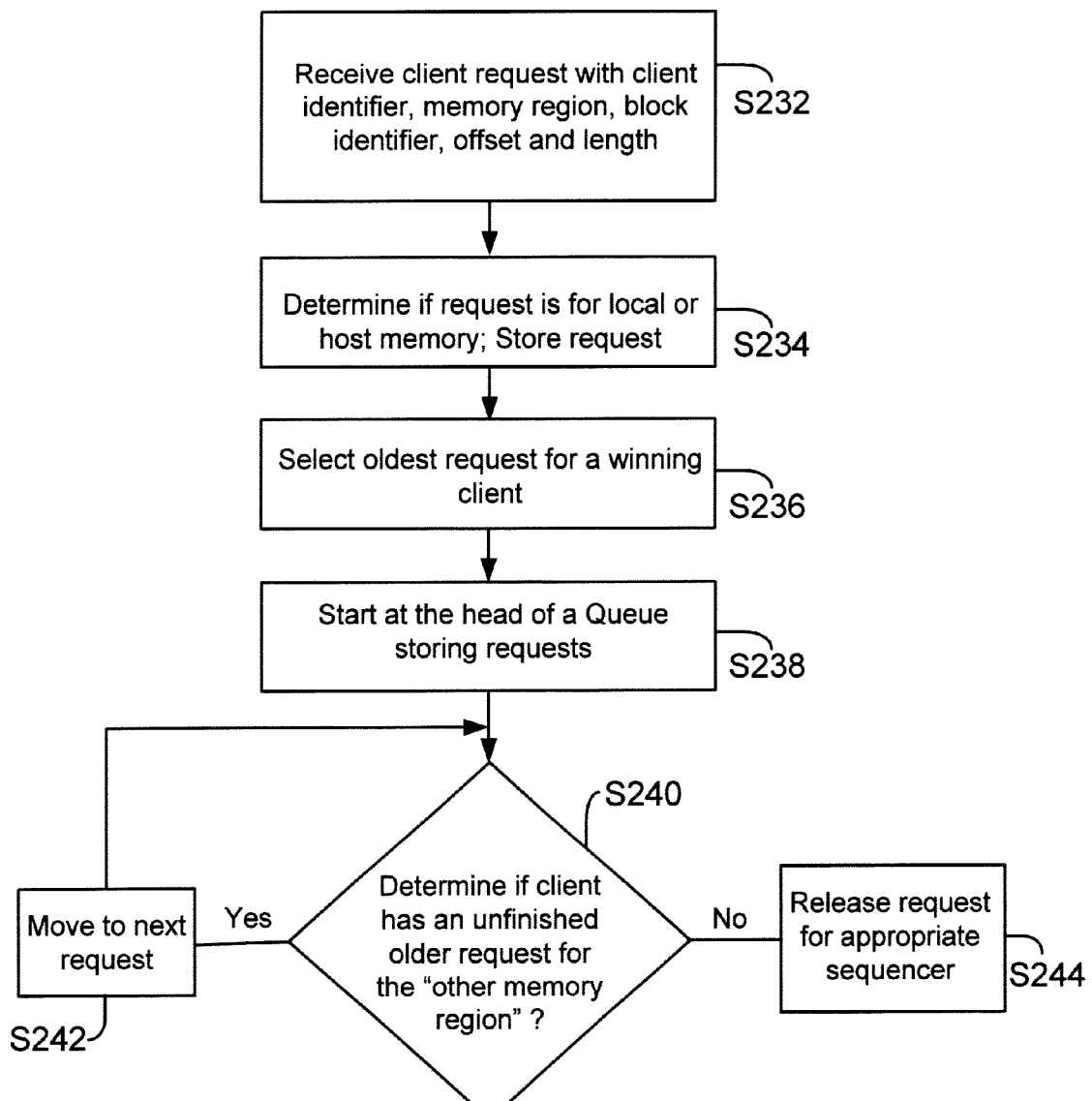
FIGS. 2C-2F show various MIM related process flow diagrams, according to one embodiment.

FIG. 2C shows a process 230 for handling requests for accessing host memory 106 and/or local memory 128, according to one embodiment. Process 230 begins at block S232, when MIM 172 receives a client request. As mentioned above, any of the modules of adapter 114 may be a client for writing information to or reading information from local memory 128 and/or host memory 106. The client request typically includes a client identifier for identifying a client, an identifier identifying a memory region, a block identifier that identifies one or more blocks within the memory region, an offset value and a length (or size) of data transfer.

Based on the request, MIM 172 determines if the request is for host memory 172 or local memory 128. MIM 172 determines that based on the region and block identifier identified in the request. If the request is for local memory 128, then MIM 172 determines the address using the region and block identifier provided in the request and configuration information regarding the region. Thereafter, the request is stored for arbitration.

In block S236, the oldest request for a winning client is selected and the request is placed at a memory storage location. The memory storage location includes a FIFO type arrangement, for example, 208A-208N (FIG. 2A), such that the oldest request is at the head of the queue, while the latest request is at the tail-end of the queue.

In block S238, MIM 172 starts at the head of the queue to evaluate each request. If the request is, for example, to access host memory 106, then MIM 172 determines if the client has any pending requests for the local memory 128. In this example, the local memory is the "other" memory. If yes, then in block S242, the process moves to the next request in the queue. If no, then in block S244, the request is sent to either the host sequencer 172E or the local sequencer 172C. The processes used by host sequencer 172E and local sequencer 172C are described below in more detail.

Figure 2D:
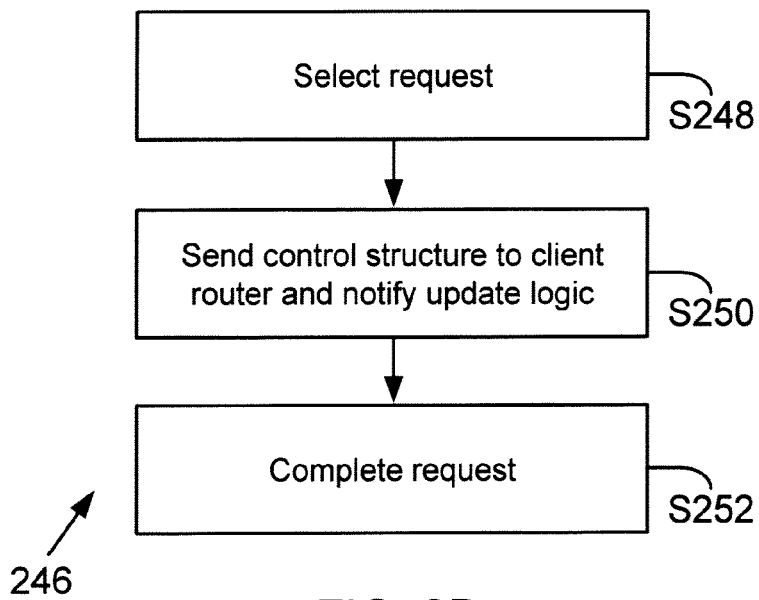

FIG. 2D shows a process 246 for processing requests by local sequencer 172C, according to one embodiment. The process begins in block S248, when a request is taken from a FIFO queue at 172A. Local sequencer 172C then sends a control structure (not shown) to client data router 172F. The control structure includes the address, length, and identifies the request type, i.e. read or write request. Update logic 204 is then notified so that it can decrement a request counter used for tracking requests for each client. Thereafter, the request is processed in block S252.

Figure 2E:
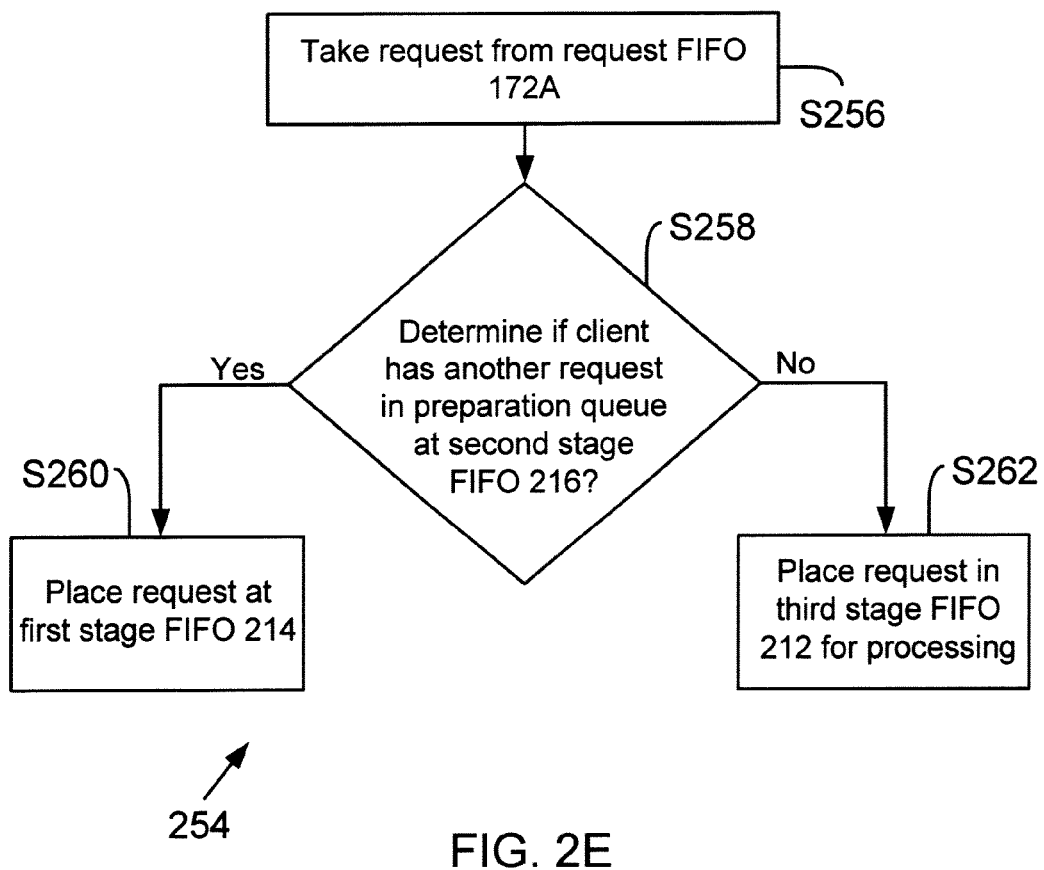
Figure 2F:
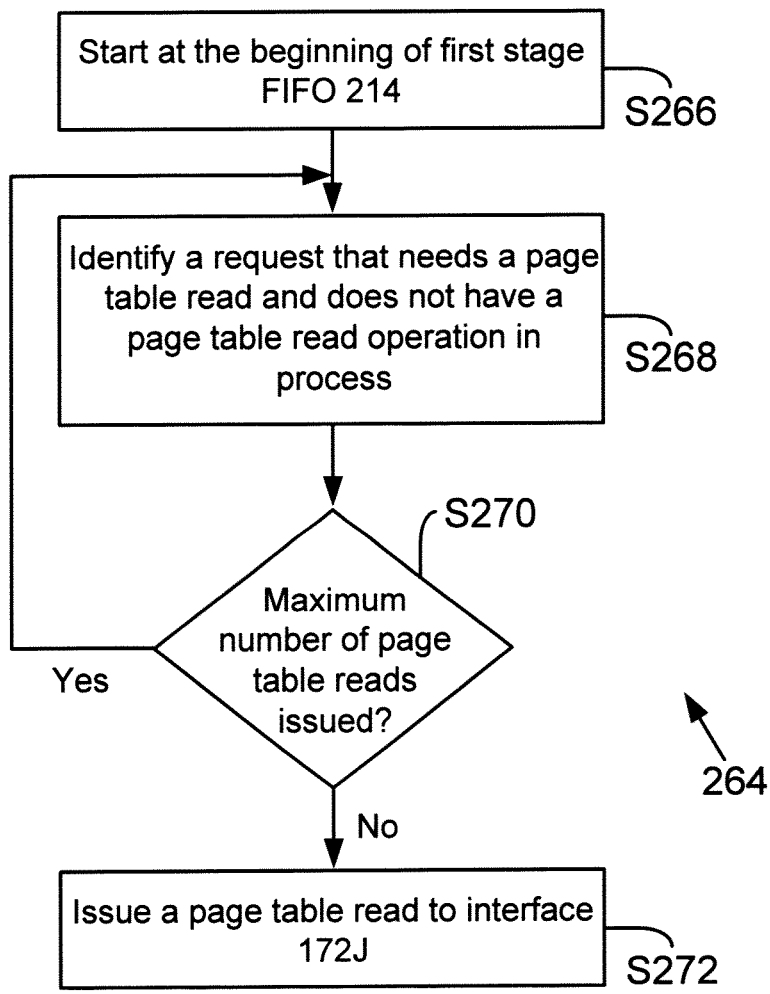

FIGS. 2E and 2F show process flow diagrams for handling requests by host sequencer 172E. With reference to FIG. 2E, the process begins in block S256, when host sequencer state machine 218 takes a request from request FIFO 172A. The state machine 218 determines in block S258 if the client associated with the selected request has any other requests pending at the first stage FIFO 214. If yes, then in block S260, the request is placed in the second stage FIFO 216, otherwise in block S262, the request is placed in data transfer FIFO 212 used for storing requests that are ready for data transfer.

FIG. 2F shows process flow 264 for processing selected requests, according to one embodiment. The process begins in block S266, when state machine 218 starts at the head of first stage FIFO 214. In block S268, state machine 218 scans the FIFO queue to determine which requests need a page table read. In block S270, state machine 218 determines if a maximum number of page table read requests have been issued. If yes, then the process loops back to block S266 to select another request. Otherwise, in block S272, a page table read request is sent to interface 172J (FIG. 2B).

Figure 3A:
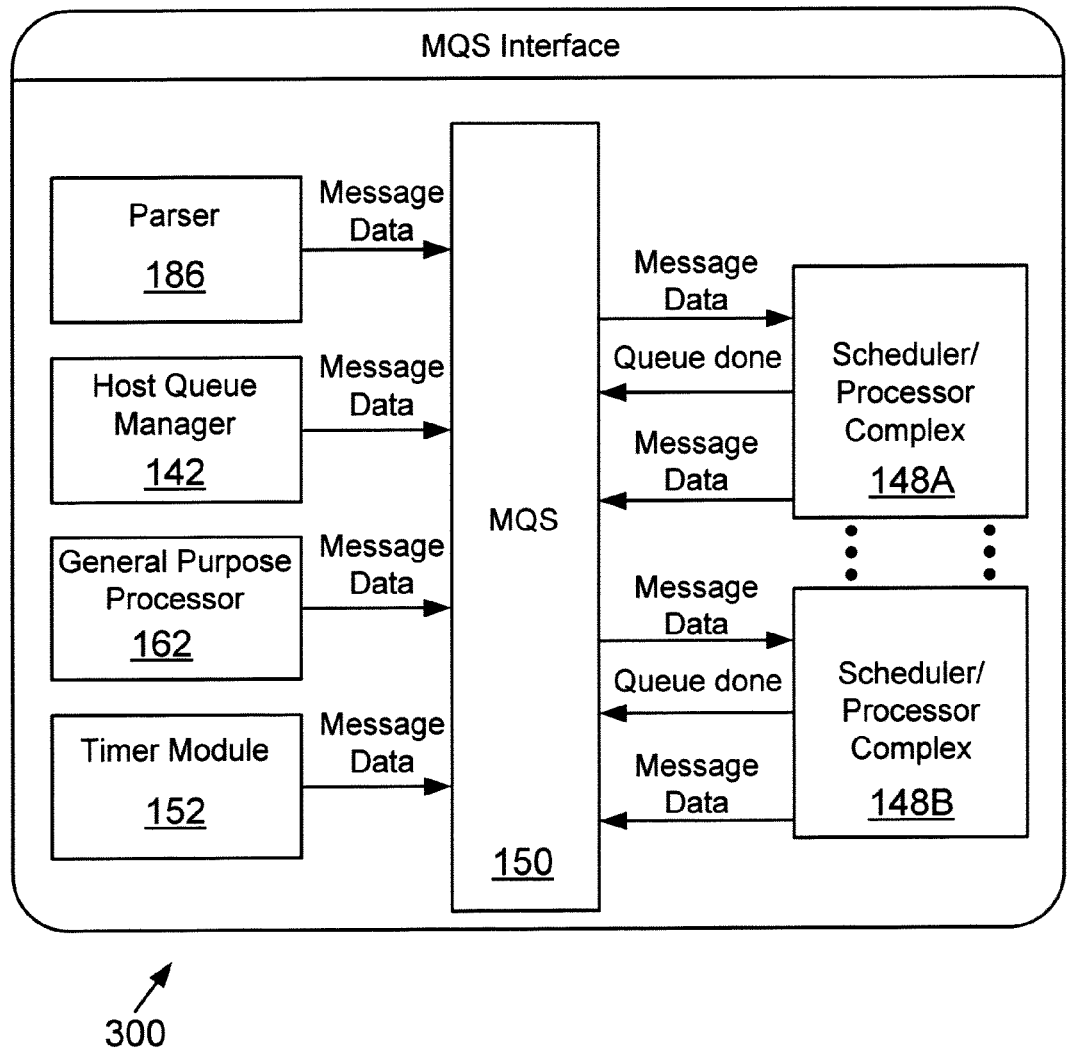
FIG. 3A is a block diagram of a message queuing system (MQS), according to one embodiment.

MQS 150:

FIG. 3A shows a system 300 where MQS 150 interfaces with a plurality of modules (or clients), for example, parser 186, HQM 142, processor 162, timer module 152 and one or more processor complexes 148A, 148B. MQS 150 manages messages from various modules and prepares them for the processors in processor complexes 148A, 148B before a processor requests the messages, according to one embodiment. Details regarding MQS 150 are provided below.

Figure 3B:
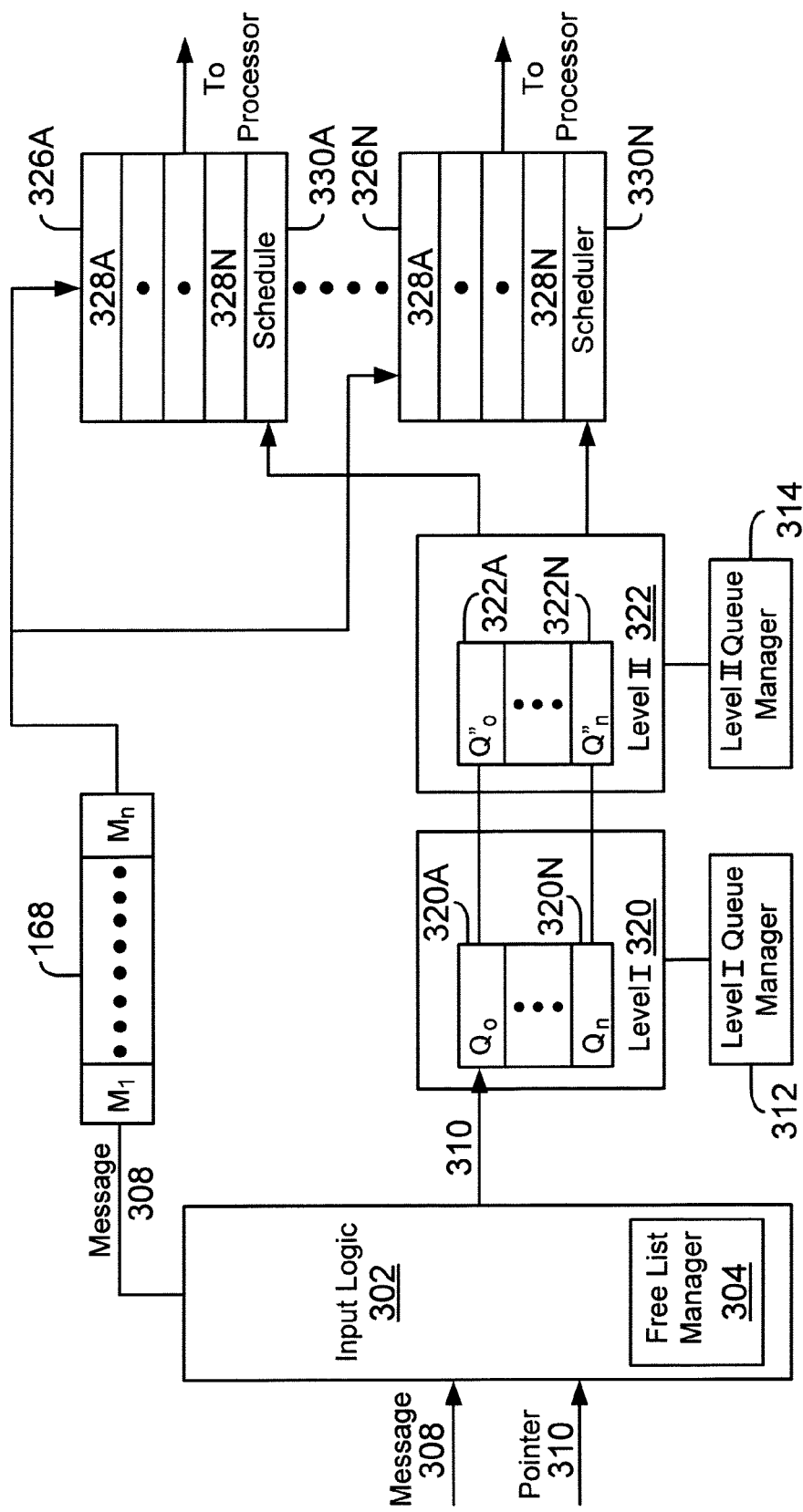
FIG. 3B is a block diagram of various components of the MQS of FIG. 3A, according to one embodiment.

FIG. 3B shows a block diagram of MQS 150 using a multi-tiered queue structure, according to one embodiment. A first level queue is associated with different protocol types, while a second level queue is associated with different connections. The first level queue and the second level queue arrangements are described below in more detail.

MQS 150 includes input logic 302 to receive one or more messages 308 having a connection identifier associated with the message 308. The connection identifier identifies the connection that is associated with message 308. The message 308 may be received from parser 186 or any other module. Input logic 302 also receives a pointer 310 (may also be referred to as link 310) associated with message 308 and is processed as described below in detail.

Input logic 302 includes a free list manager 304 that maintains a data structure of free memory space locations ($M_1$-$M_n$) at local memory 168. When the message 308 is received by input logic 302, it is placed at one of the available memory locations. The pointer 310 associated with the message 308 is placed at either the first level queue or the second level queue, as described below.

MQS 150 maintains a two level queuing system 320 and 322 for storing pointers associated with received messages. The first level queue 320 includes queues (or memory slots) 320A-320N that are managed by a first level queue manager 312. The first level queue memory slots 320A-320N are assigned to specific protocol types. For example, Fibre Channel, Ethernet, FCoE, RoCE and/or iSCSI each may have its own assigned first level queue. The queues may be assigned during a configuration step such that when message 308 is received, input logic 302 knows which first level queue is assigned to the message.

The second level queue 322 includes memory slots 322A-322N and is managed by a second level queue manager 314. The second level queues 322A-322N are assigned to connections that can be simultaneously worked on by adapter 114. In one embodiment, the second level queue 322 may have more slots than the first level queue 320. In another embodiment, each second level queue is associated with at least one first level queue.

Figure 3C:
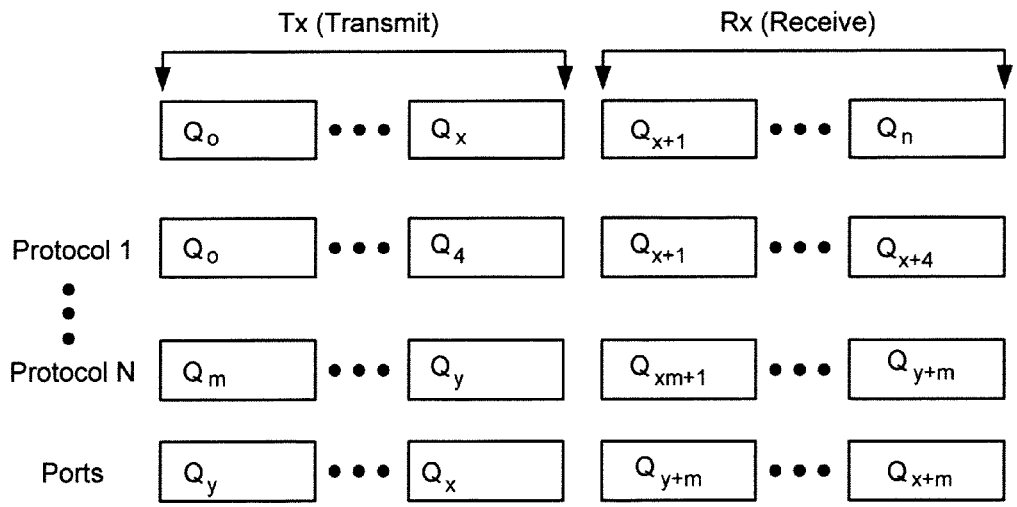
FIGS. 3C-3D are block diagrams of assigning queues of the MQS, according to one embodiment.

FIG. 3C shows an example of assigning the first level queues 320A-320N, according to one embodiment. Adapter 114 receives and transmits frames and packets complying with multiple protocols. To accommodate such an operating environment, the first level queues 320A-320N are split between transmit (Tx) and receive (Rx) sides. The transmit sides may be assigned queues $Q_0$-$Q_x$ and the receive side may be assigned queues $Q_{x+1}$ to $Q_n$. From among queues $Q_0$-$Q_x$, some queues are dedicated to specific protocols. For example, a first protocol type may be assigned queues $Q_0$-$Q_4$, and an nth protocol type (shown as Protocol N) is assigned queues $Q_m$-$Q_y$. Protocol 1 may be Fibre Channel, Protocol 2 may be Ethernet, Protocol 3 may be FCoE, and Protocol 4 may be iSCSI and so forth. Each protocol is assigned a dedicated memory location at the first level queues 320. The receive side assignment is similar to the transmit side.

Figure 3D:
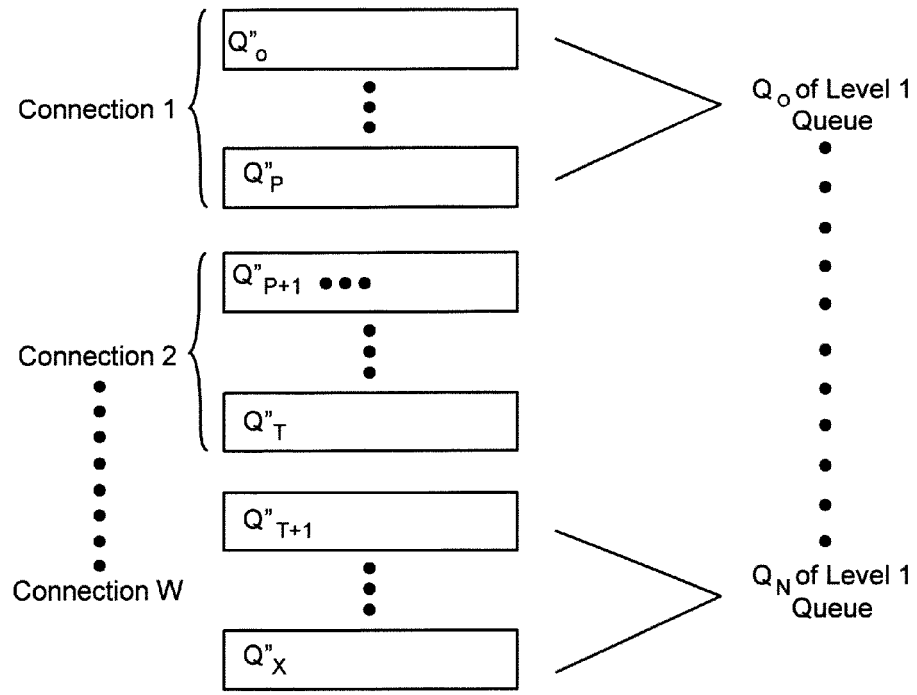

FIG. 3D shows an example for assigning the second level queues 322A-322N. Some of the second level queues, for example, $Q''_0$-$Q''_p$ may be assigned to a first level queue that is maintained by adapter 114 at any given time. Queues $Q''_0$-$Q''_p$ may be associated with $Q_0$ first level queue 320A-320N. Similarly, other second level queues are assigned to other connections and are associated with other level one queue 320.

Referring back to FIG. 3B, each processor in the processor complexes 148A, 148B is assigned a plurality of memory buffer modules 326A-326N having a plurality of storage locations 328A-328N. Each buffer module includes a scheduler 330A-330N that is used for moving a message to a processor.

In one embodiment, each processor is assigned to a buffer module, for example, a processor 0 in processor complex 148A may be assigned to buffer module 326A, while processor N is assigned to buffer module 326N. Scheduler 330A moves messages for processor 0, while scheduler 330N moves messages for processor N.

Figure 4:
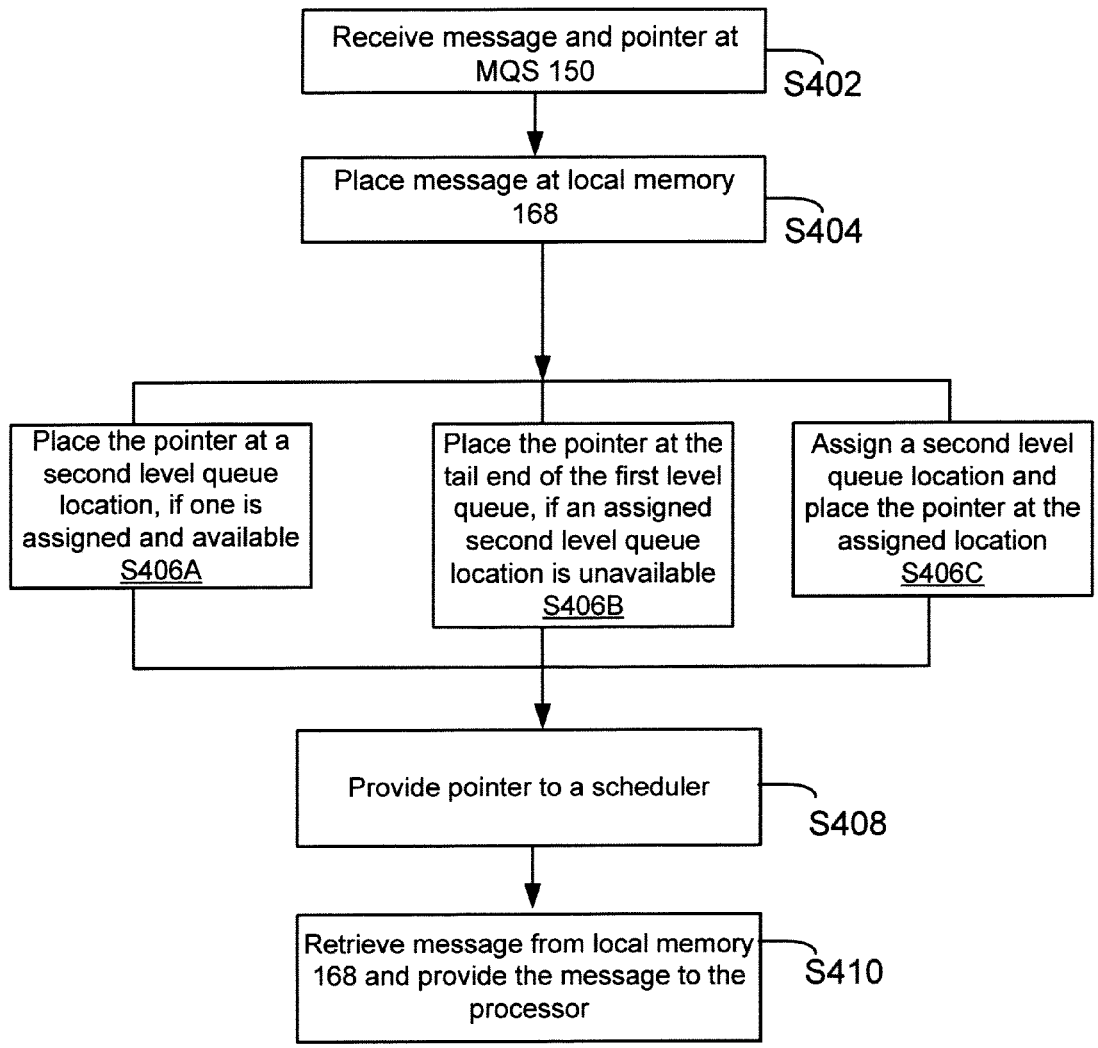
FIG. 4 is a process flow diagram for handling messages, according to one embodiment.

FIG. 4 shows a process flow diagram for using MQS 150, according to one embodiment. The process 400 begins in block S402, when the message 308 and the pointer 310 associated with the message are received. The message 308 includes a connection identifier (connection ID) that is received from a module, for example, parser 186. An example of a message may be an information packet that is generated for describing a received frame. The information may include the size of the frame, source identifier or any other information.

In block S404, input logic 302 uses the free list manager 304 to determine a free memory location at local memory 168. Thereafter, the message is placed at the available location of local memory 168.

Blocks S406A-S406C are various options for handling pointer 310, in one embodiment. In block S406A, the pointer is placed at one of the second level queues 322A-322N that is assigned to the connection ID of message 308 and if the queue is available, i.e. not occupied with another pointer. In block S406B, the pointer 310 is placed at the tail end of the first level queue that is assigned to the connection ID, if the assigned second level queue location is unavailable. This allows one to process other pointers that are already waiting at the first level queue. In block S406C, a second level queue location is assigned to the connection ID, if one is not assigned when the message is received. The pointer 310 is then placed at the second level queue location. If a second level queue location is unassigned and unavailable, then, similar to S406B, the pointer 310 simply waits at the tail end of the first level queue until a second level queue location becomes available.

In block S408, the pointer is provided to a scheduler from among 330A-330N. In block S410, the scheduler fetches the message from local memory 168 and provides it to one of the processors of processor complexes 148A, 148B.

In one embodiment, when the processor receives message 308 from MQS 150, it may need some state information to validate the message. The state information may be stored and managed by MIM 172. State information may include SCSI context information, Fibre Channel Physical Connection Block (FCPCB), TCP state information and others. MQS 150, after receiving the message 308, pre-fetches the state information from HQM 142 and/or parser 186. The state information may be temporarily stored at a memory location, for example, at a memory cache (not shown). The state information is readily available for the processor that gets message 308. This prevents any delay in message validation/processing.

In another embodiment. MQS 150 may consolidate a plurality of messages that share the same state information. The consolidated messages with the same state information are provided to the processor so that the messages can be processed efficiently.

In another embodiment, individual processors are not dedicated to individual protocols, instead a plurality of processors can be used to process messages for different protocols. For example, a same processor may be used to process an FCoE message and a niSCSI message. Because the messages are forwarded in an efficient manner, adapter 114 can process frames complying with different protocols.

The systems and methods described above have various advantages. An integrated network device can efficiently process packets for multiple connections complying with multiple protocols using the various modules described above in detail. Messages for various processors for a processor complex are pre-fetched and ready for processing even before the processor requests those messages.

Thus, systems and methods for sending and receiving information using multiple protocols have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. An adapter coupled to a host computing device for sending and receiving information, comprising:
    a port complex having:
        a plurality of ports configured to operate at different operating speeds for sending and receiving frames complying with different protocols, where the plurality of ports send frames on behalf of the host computing device and receive frames from other devices; and
        an arbiter that selects one of the received frames for processing after the received frames are stored at arbiter temporary storage locations, wherein when a frame is encrypted, the arbiter first sends the frame to a decryption module of the port complex and after the frame is decrypted, the decrypted frame is selected by the arbiter for processing;
    a processor complex having a plurality of processors for processing frames complying with different protocols and received by any of the plurality of ports; wherein each processor of the processor complex can process frames complying with any of the different protocols and originating from any of the plurality of ports;
    a message queuing system (MQS) interfacing with the port complex and the processor complex for managing messages for the plurality of processors regarding the received frames complying with different protocols;
    a general processor for configuring the adapter; and
    a memory interface module that manages requests from any processor of the processor complex; the general processor and any component of the port complex to access a local adapter memory and a host computing device memory for processing received frames, transmitting frames and configuring the adapter; wherein an arbiter of the memory interface module arbitrates between requests for the local adapter memory and the host computing device memory.

2. The adapter of claim 1, wherein the plurality of ports are configured to send and receive information complying with Ethernet, Fibre Channel, Fibre Channel over Ethernet (FCoE), Internet Small Computer Systems Interface (iSCSI), and remote direct memory access over converged Ethernet (RoCE) protocols.

3. The adapter of claim 1, wherein the port complex includes a first parser that initially parses a frame received by one of the plurality of ports and arbitrated by the arbiter of the port complex by performing an initial checksum and determining a cyclic redundancy code.

4. The adapter of claim 1, wherein the memory interface module arbiter determines if a request is for the local adapter memory or the host computing device memory based on a memory region and a block identifier.

5. The adapter of claim 4, wherein when the request is for the local adapter memory, the request is processed by a local sequencer and when the request is for the host computing device memory, it is processed by a host sequencer.

6. The adapter of claim 3, wherein the first parser places the frame for further processing at a temporary memory storage having a plurality of memory storage locations.

7. The adapter of claim 6, wherein the port complex further includes a scheduler that selects the frame from the temporary memory storage location and forwards the frame to a second parser for further processing.

8. The adapter of claim 7, wherein the second parser generates a message associated with the frame for one of the plurality of processors and provides the message to the MQS.

9. The adapter of claim 8, wherein the message includes a first portion in a standard format regardless of a frame type and a second portion which is based on the frame type.

10. The adapter of claim 9, wherein the frame type includes an Ethernet frame type, a Fibre Channel frame type, a Fibre Channel over Ethernet frame type, an Internet Small Computer Systems Interface (iSCSI) frame type, and a remote direct memory access over converged (RoCE) frame type.

11. An adapter coupled to a host computing device for sending and receiving information, comprising:
a port complex having:
a plurality of ports configured to operate at different operating speeds for sending and receiving frames complying with different protocols; where the plurality of ports send frames on behalf of the host computing device and receive frames from other devices;
an arbiter that selects one of the received frames for processing after the received frames are stored at arbiter temporary storage locations, wherein when a frame is encrypted, the arbiter first sends the frame to a decryption module of the port complex and after the frame is decrypted, the decrypted frame is selected by the arbiter for processing;
a first parser that initially parses a frame received by one of the plurality of ports and arbitrated by the arbiter by performing an initial checksum and determining a cyclic redundancy code and places the frame for further processing at a temporary memory storage having a plurality of memory storage locations; and
a scheduler that selects the frame from the temporary memory storage location and forwards the frame to a second parser that generates a message associated with the frame for one of a plurality of processors of a processor complex; wherein each processor can process frames complying with any of the different protocols and originating from any of the plurality of ports;
a message queuing system (MQS) interfacing with the port complex and the processor complex for managing messages for the plurality of processors regarding the received frames complying with different protocols; wherein the MQS uses a multi-tiered queue structure for storing pointers for messages with first level queue slots assigned to different protocols and second level queue slots being associated with different connections that the adapter has at any given time;
a general processor for configuring the adapter; and
a memory interface module that manages requests from any processor of the processor complex; the general processor and any component of the port complex to access a local adapter memory and a host computing device memory; wherein an arbiter of the memory interface module arbitrates between requests for the local adapter memory and the host computing device memory for processing received frames, transmitting frames and configuring the adapter.

12. The adapter of claim 11, wherein the message generated by the second parser includes a first portion in a standard format regardless of a frame type and a second portion which is based on the frame type.

13. The adapter of claim 12, wherein the frame type includes an Ethernet frame type, a Fibre Channel frame type, a Fibre Channel over Ethernet frame type, an Internet Small Computer Systems Interface (iSCSI) frame type, and a remote direct memory access over converged (RoCE) frame type.

14. The adapter of claim 11, wherein the memory interface module arbiter determines if a request is for the local adapter memory or the host computing device memory based on a memory region and a block identifier.

15. An adapter coupled to a host computing device for sending and receiving information, comprising:
a port complex having:
a plurality of ports configured to operate at different operating speeds for sending and receiving frames complying with different protocols, where the plurality of ports send frames on behalf of the host computing device and receive frames from other devices;
an arbiter that selects one of the received frames for processing after the received frames are stored at arbiter temporary storage locations, wherein when a frame is encrypted, the arbiter first sends the frame to a decryption module of the port complex and after the frame is decrypted, the decrypted frame is selected by the arbiter for processing;
a first parser that initially parses a frame received by one of the plurality of ports and arbitrated by the arbiter by performing an initial checksum and determining a cyclic redundancy code and places the frame for further processing at a temporary memory storage having a plurality of memory storage locations; and
a scheduler that selects the frame from the temporary memory storage location and forwards the frame to a second parser that generates a message associated with the frame for one of a plurality of processors of a processor complex; wherein each processor can process frames complying with any of the different protocols and originating from any of the plurality of ports;
a message queuing system (MQS) interfacing with the port complex and the processor complex for managing messages for the plurality of processors regarding the received frames complying with different protocols;
a general processor for configuring the adapter; and
a memory interface module that manages requests from any processor of the processor complex; the general processor and any component of the port complex to access a local adapter memory and a host computing device memory; wherein an arbiter of the memory interface module arbitrates between requests for the local adapter memory and the host computing device memory for processing received frames, transmitting frames and configuring the adapter.

16. The adapter of claim 15, wherein the message generated by the second parser includes a first portion in a standard format regardless of a frame type and a second portion which is based on the frame type.

17. The adapter of claim 16, wherein the frame type includes an Ethernet frame type, a Fibre Channel frame type, a Fibre Channel over Ethernet frame type, an Internet Small Computer Systems Interface (iSCSI) frame type, and a remote direct memory access over converged (RoCE) frame type.

18. The adapter of claim 15, wherein the MQS uses a multi-tiered queue structure for storing pointers for messages with first level queue slots assigned to different protocols and second level queue slots being associated with different connections that the adapter has at any given time.

19. The adapter of claim 15, wherein the memory interface module arbiter determines if a request is for the local adapter memory or the host computing device memory based on a memory region and a block identifier.

20. The adapter of claim 19, wherein when the request is for the local adapter memory, the request is processed by a local sequencer and when the request is for the host computing device memory, it is processed by a the host sequencer.

* * * * *

UNITED STATES PATENT AND TRADEMARK OFFICE
CERTIFICATE OF CORRECTION

| | | |
|---|---|---|
| PATENT NO. | : 9,094,333 B1 | Page 1 of 1 |
| APPLICATION NO. | : 13/328919 | |
| DATED | : July 28, 2015 | |
| INVENTOR(S) | : Klemin et al. | |

It is certified that error appears in the above-identified patent and that said Letters Patent is hereby corrected as shown below:

Specification

In column 13, line 26, delete "embodiment." and insert -- embodiment, --, therefor.

Claims

In column 15, line 14, in Claim 11, delete "protocols;" and insert -- protocols, --, therefor.

In column 17, line 4, in Claim 20, delete "a the" and insert -- the --, therefor.

Signed and Sealed this
Eighth Day of March, 2016

Michelle K. Lee
*Director of the United States Patent and Trademark Office*